United States Patent
Reid

[11] 3,919,043
[45] Nov. 11, 1975

[54] DIGITAL NUCLEAR REACTOR CONTROL ROD POSITION INDICTION SYSTEM

[75] Inventor: James B. Reid, Monroeville, Pa.

[73] Assignee: Westinghouse Electric Corporation, Pittsburgh, Pa.

[22] Filed: Oct. 17, 1973

[21] Appl. No.: 407,339

[52] U.S. Cl............................................. 176/19 R
[51] Int. Cl............................................. G21c 17/12
[58] Field of Search............ 176/19 R, 19 J, 23, 33, 176/35, 36 R; 307/309; 324/34 PS; 340/282

[56] References Cited
UNITED STATES PATENTS 3,221,261  11/1965  Ertel ........................... 307/309
3,656,074  4/1972  Bevilacqua et al............... 176/19 R

*Primary Examiner*—Stephen C. Bentley
*Attorney, Agent, or Firm*—D. C. Abeles

[57] ABSTRACT

A digital nuclear reactor control rod position indication system employing a plurality of Hall Effect transducers longitudinally spaced along the control rod drive housing. The transducers are individually responsive to a magnetic field generated by a magnetized portion of the control drive rod to respectively provide an output when in substantial proximity to the magnetized rod portion. The transducer outputs are multiplexed to display the relative position of the control rods within the reactor core.

7 Claims, 4 Drawing Figures

DIGITAL NUCLEAR REACTOR CONTROL ROD POSITION INDICTION SYSTEM

BACKGROUND OF THE INVENTION

This invention pertains in general to nuclear reactor control rod position indication systems and more particularly to such systems that provide discrete indications of the location of control rods within the reactor core.

One type of control rod mechanism for a nuclear reactor is an electrically controlled, hydraulically operated device which individually moves control rods between two rest positions; either full in or full out. Each control rod consists of at least one neutron absorber element, approximately the same size as the fuel rods. Each control rod is connected to a hydraulic mechanism and travels in guide thimbles provided within the fuel assembly. In the inserted position, the absorber elements fit into corresponding fuel assembly thimbles and in the withdrawn position they move into guide tubes. This is the same arrangement used in current pressurized water reactor design, except that in the aforedescribed system the rods cannot assume any intermediate positions other than being either fully inserted or fully withdrawn, while in present designs the rods can assume intermediate positions within the reactor core. Each hydraulic control rod mechanism is a completely independent system which controls the movement of one drive rod and its associated absorber rods. In this example, two interconnected absorber rods form one control rod. For a better understanding of the operation of the aforedescribed control system, reference can be had to U.S. Pat. No. 3,519,535, issued July 7, 1970, by Robert J. French et al., entitled FUEL ASSEMBLY WITH PLURAL INDEPENDENT CONTROL ELEMENTS AND SYSTEM THEREFOR.

Several types of indicators have been considered for application in such control systems to monitor the relative position of the control rods within the nuclear core. The first indicator considered was a transformer type rod position indicator. This indicator consisted of a transformer wound on a C-core with an auxiliary coil in series with a secondary winding. The poles of the C-core pass through the control rod housing and are welded to the housing. The magnetic circuit is opened or closed by the absence or presence of the magnetic drive rod which is used as part of the magnetic circuit. When the drive rod is present and the magnetic circuit is closed, the secondary voltage is large due to transformer action. When the rod is missing, the secondary voltage is small because of the reluctance of the magnetic circuit, and the effects of an auxiliary coil provided to null out the secondary voltage. This arrangement has two basic disadvantages, due to the shorting effect of the nonmagnetic metallic drive rod housing on the transformer, which lead to its unreliable and ineffective use. First, it must be excited by a low frequency sinusoidal signal, for example 10 hertz, which requires some sort of frequency converter as a source; and second, due to the shorting effect, the reliability of obtaining good output signal magnitudes is directly effected by the effective resistance of the shorted turn which, as is well known, is not temperature stable. It should be noted that various other arrangements of magnetic circuits have been designed with increasing complexity to avoid the adverse effects experience. At most, the design variations provide some compensation without complete resolution of the problem.

Another type of rod position indicator that was considered for such an application is a variable magnetic coupling type rod position indicator. In this type of system an array of coils is placed over the control rod travel housing. Alternate coils are connected in series to form a primary and a secondary winding. The primary is supplied with an AC source. Since the drive rod is made from a magnetic stainless steel and the rod travel housing is made from a nonmagnetic stainless steel, the inductive coupling between the two windings, and hence, the voltage appearing across the secondary winding is a function of the insertion of the drive rod.

The most serious shortcoming of the variable magnetic coupling type of rod position indicator is its sensitivity to temperature variations. The magnetic properties of the drive rod, and hence the coupling between the windings, is highly temperature dependent. The fact that the rod travel housing is made from a high conductivity metal, further limits the performance of the system, the rod travel housing acts as a short-circuited signal turn winding. Most of the power supplied to the primary winding is dissipated in the form of eddy current circulating within the wall of the rod travel housing. Furthermore, the variable magnetic coupling type array requires the use of expensive high temperature insulating materials to prevent coil burn-up.

Thus, a new rod position indicator is desired to overcome the disadvantages of those already considered. Preferably, a system that could be supported on and spaced from the rod travel housing is desired in order to negate the effects of the high temperature environment and insure the sealed integrity of the housing.

SUMMARY OF THE INVENTION

Briefly, this invention supplies the desired characteristics by providing a system employing Hall Effect transducers to indicate the relative position of the control rods within the core of a nuclear reactor, in discrete steps. The transducers are arranged in tandem at predetermined intervals spaced longitudinally along the elongated control rod drive housing within proximity to the external perimeter of the housing. The individual transducers are responsive to the influence of a magnetic field generated by a magnetized portion of a control drive rod to provide a corresponding output when in close proximity to the magnetized portion. The transducer outputs are displayed as an indication of the control rod position within the reactor vessel and, in preferred form, as a digital indication thereof. In the preferred embodiment the transducer array is supported spaced from the control rod drive housing to maintain a degree of thermal insulation between the environment of the housing and the active transducer elements.

BRIEF DESCRIPTION OF THE DRAWINGS

For a better understanding of the invention, reference may be had to the preferred embodiment, exemplary of the invention, shown in the accompanying drawings, in which.

DESCRIPTION OF THE PREFERRED EMBODIMENT

Figure 1:
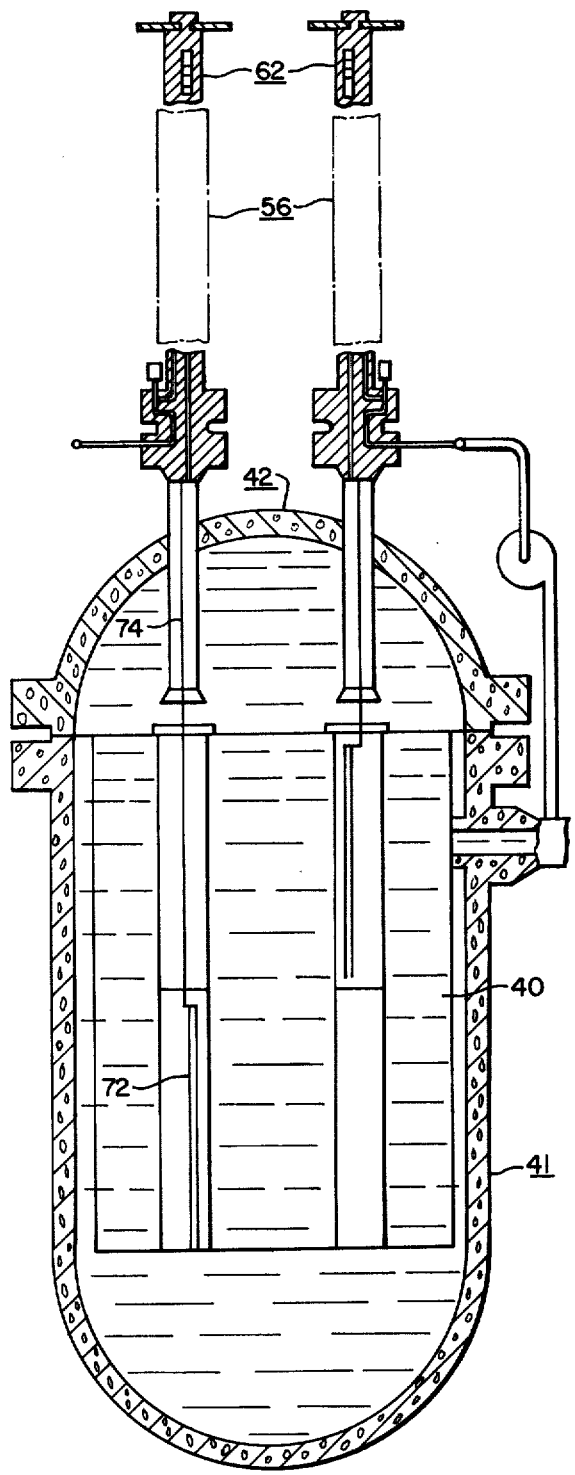
FIG. 1 is a schematic diagram of a nuclear reactor and its control rod drive system embodying the novel position indication system of this invention.

Accurate knowledge of the position of control rods within a nuclear reactor is essential for ensuring the reactor's safe and efficient operation. As may be appreciated by referring to FIG. 1, sensing the of position of control rods within a pressurized water reactor is particularly difficult because of the necessity for maintaining the sealed integrity of the reactor pressure vessel 41. The control rods 72 and the drive rods 74 which are structurally coupled to their respective control rods 72 are surrounded by water 40 which completely fills the pressure vessel 41. Under normal operating conditions, the water is maintained at a high temperature and pressurized so that no boiling takes place.

The position of the control rods 72 must be determined from measurements of the state of sensing elements placed outside the pressure vessel 41, because no mechanical penetration of the pressure vessel 41 for the purposes of control rod position sensing is permitted. The only area where such sensing elements can be placed is along the rod travel housing 62. The drive rods 74 move within their respective rod travel housings 62, which longitudinally extend upward from the head 42 of the reactor.

Sensing elements 56 placed along the rod travel housing 62 can sense the position of the drive rod 74 only. However, it is normally assumed that the fastening of the control rods 72 to their corresponding drive rods 74 is reliable and therefore the displacement of the drive rods 74 will provide an accurate indication of the position of the corresponding control rods 72 within the reactor. For a more detailed understanding of the reactor control rod system, reference can be had to application Ser. No. 304,292, filed Nov. 6, 1972, by Robert J. Creagan et al., entitled FUEL ASSEMBLY FOR NUCLEAR REACTORS, assigned to the Westinghouse Electric Corporation.

A new control rod position indication system has been developed for detecting the presence or absence of the control rods at the indicator locations. The new indication system is particularly suitable for operation in the adverse thermal environment of a nuclear reactor in that it can be spaced from and does not require direct physical contact to any portion of the reactor structure.

Figure 2:
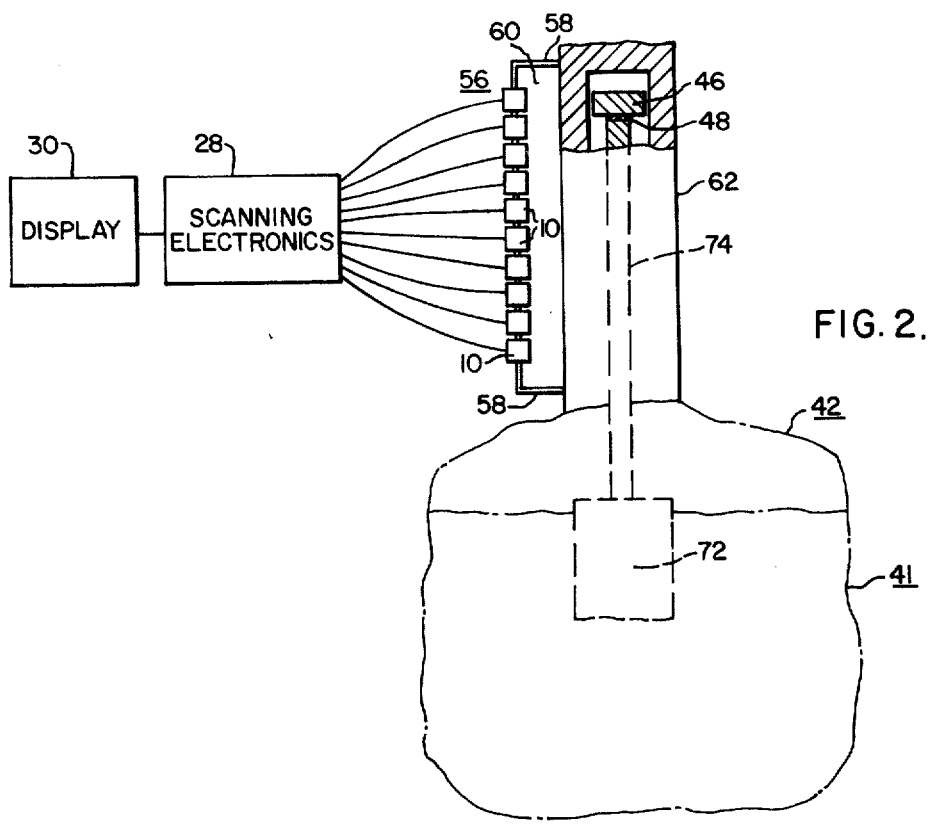
FIG. 2 is a schematic block diagram of the electronic portion of the system embodying this invention.

Basically, the indication system of this invention includes a tandem array of a plurality of Hall Effect transducers 56 which are positioned longitudinally along the control rod drive housing 62, desirably spaced from the perimeter of the housing as shown in FIG. 2. The transducer array is preferably supported from a portion of the reactor head 42 to facilitate ease of entry to the core during refueling. In the schematic shown in FIG. 2 the array 56 is supported by support structure 58 positioned at the upper and lower terminations of the control rod drive housing 62. The air gap 60 maintained between the sensor array and the housing thermally insulates the sensors from the adverse environment of the in-vessel structure. Additional thermal insulation can be interposed between the array and the housing to further enhance the reliability of the sensors. A portion 46 of the control drive rod 74 is magnetized and the individual sensors 10 are responsive to the proximity of the magnetic field generated by the magnetized portion to provide respective outputs. In current pressurized reactor designs the control drive rod is constructed of magnetic stainless steel. Therefore, magnetically insulated material 48 is positioned between the magnetized portion and the remainder of the rod to prevent magnetization of the entire rod. In the embodiment shown in FIG. 2 the magnetized portion is formed out of hard magnetic material and affixed to the lead end of the control drive rod extending into the rod travel housing. It should be understood, however, that the magnetized portion can be formed at any intermediate segment of the control drive rod which extends, during the major portion of its travel, into the rod travel housing.

Figure 4:
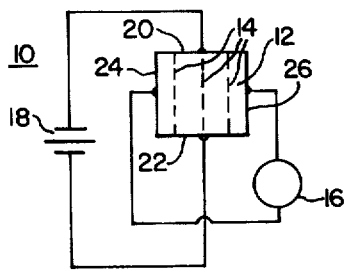
FIG. 4 is a schematic diagram illustrative of the basic operation of the sensor employed in the system of this invention.

The basic operation of the sensor can better be understood by reference to FIG. 4. A potential 18 is established across two sides 20 and 22 of an electrically conductive material, i.e. semiconductors), establishing a flow of electrons froming equal potential lines 14 within the material 12. In the absence of a magnetic field zero potential will exist across opposite sides 24 and 26 of the material. If a magnetic field is introduced, such as the bar magnet 46, the path of the electrons through the material will alter, creating a potential between points 24 and 26 which can be measured by any suitable means, such as an ammeter 16. This basic phenomena is generally known as the Hall Effect and has only recently been perfected to exhibit enough sensitivity to obtain a measurable reading at the output 16. Accordingly, as the magnet 46 traverses its linear path, the individual sensors will be responsive to provide an output indicative of the relative location of the magnet. Inasmuch as no induction coils or permeable magnetic circuits are employed the sensors can be positioned at a distance from the housing dependent upon the strength of the magnetic field and the sensitivity of the sensors. Thus, greater thermal insulation can be provided between the transducers and the reactor environment, enhancing the reliability and effectiveness of the elements involved.

Figure 3:
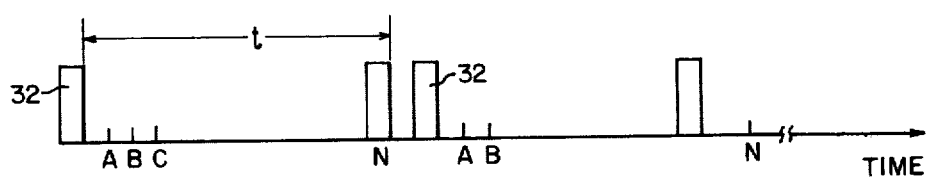
FIG. 3 is a graphical illustration of the output signals generated by the circuit of FIG. 2.

The outputs of the respective sensors are multiplexed in a conventional manner by the scanning electronics 28 to the display 30. An exemplary output of the scanning electronics is illustrated in FIG. 3. An initial pulse 32 is coded to indicate the start of each new scan and functions to synchronize the trace of a cathode ray tube display. The time slots A, B, C, ... N, appearing on the display are indicative of the position of the magnetic portion 46. A new synchronizing pulses 32 is provided after each scan to initiate a new trace on the display 30. Accordingly, the basic output of the scanning device is a train of pulse as shown in FIG. 3 consisting of a starter synchronizing pulse followed at a later time by at least one other pulse positioned in a time frame established by the scanning electronics and the sensor 10 under the influence of the magnetic portion 46. To avoid ambiguity, the spacing of the transducers and the length and strength of the magnetic portion of the control drive rod are designed such that at least one sensor is under the influence of the magnet at any point in time. Preferably, one or two sensors should be influenced at a time. With a design factor of two sensors being under the influence of the magnetic portion, redundancy can be achieved while still maintaining a discrete output indicative of the control rod location.

The system thus describe provides increased accuracy and is less temperature dependent than the system provided by the prior art todate. In addition, the simplicity of the system enables a corresponding cost savings without loss of redundancy or reliability.

I claim as my invention:

1. A digital nuclear reactor control rod position indication system for indicating the position of an elongated movable control drive rod having one degree of freedom along its longitudinal axis within a control rod drive housing which extends longitudinally outward from the reactor vessel enclosure, comprising:

a magnetized member forming a portion of the control drive rod;

a plurality of Hall Effect transducers spaced at predetermined intervals in a tandem array longitudinally extending along an axis parallel to the axis of the control rod drive housing within proximity to the external perimeter of the housing, said transducers respectively providing an output when in proximity to said magnetized member to an extent to be under substantial influence of its magnetic field;

means for multiplexing the transducers outputs; and means for displaying said multiplexed outputs in digital form to provide an indication of the position of the control rod within the reactor vessel.

2. The control rod position indication system of claim 1 wherein said magnetized member is formed as an integral part of the control drive rod at the lead end thereof extending into the control rod drive housing.

3. The control rod position indication system of claim 1 wherein said magnetized member is formed from hard magnetic material.

4. The control rod position indication system of claim 1 wherein said magnetized member is magnetically insulated from the remainder of the control drive rod.

5. The control rod position indication system of claim 1 wherein the longitudinal length of the magnetized member along the control drive rod and the spaced intervals of said transducers are sized to enable only one transducer at a time to be substantially effected by the magnetic field of said magnetized member.

6. The control rod position indication system of claim 1 wherein said plurality of transducers are spaced from said control rod drive housing.

7. The control rod position indication system of claim 6 wherein said plurality of transducers are thermally insulated from the control rod drive housing.

* * * * *